(12) United States Patent
Copping

(10) Patent No.: US 6,773,198 B2
(45) Date of Patent: Aug. 10, 2004

(54) FIXTURE

(76) Inventor: Robert Copping, 6 Waterside, Bingley West Yorkshire (GB), BD16 2SN (*) Notice: Subject to any disclaimer, the term of this patent is extended or adjusted under 35 U.S.C. 154(b) by 0 days.

(21) Appl. No.: 10/182,598

(22) PCT Filed: Jan. 26, 2001

(86) PCT No.: PCT/GB01/00305
§ 371 (c)(1),
(2), (4) Date: Jul. 29, 2002

(87) PCT Pub. No.: WO01/55526
PCT Pub. Date: Aug. 2, 2001

(65) Prior Publication Data
US 2003/0012596 A1 Jan. 16, 2003

(30) Foreign Application Priority Data
Jan. 29, 2000 (GB) .............................................. 0002006

(51) Int. Cl.[7] .............................. F16B 12/36; F16B 7/00
(52) U.S. Cl. ........................ 403/313; 403/292; 403/293; 403/299; 403/300; 52/726.1
(58) Field of Search ............................. 403/16, 19, 177, 403/185, 186, 293, 300, 309–311, 313, 315, 331, 341, 365, 369, 371, 377, 287, 292, 299; 52/726.1; 700/98, 118, 119, 161, 195, 197; 285/34, 35, 373, 419

(56) References Cited

U.S. PATENT DOCUMENTS

| | | | |
|---|---|---|---|
| 3,921,281 A | 11/1975 | Hattori et al. | |
| 4,095,389 A | * 6/1978 | Outram et al. | 52/726.1 |
| 5,152,556 A | * 10/1992 | Holland et al. | 285/373 |
| 5,606,839 A | * 3/1997 | Baumann | 52/726.1 |
| 5,681,126 A | * 10/1997 | Lin | 403/313 |
| 5,746,555 A | 5/1998 | McEvoy | |
| 5,781,652 A | * 7/1998 | Pratt | 700/161 |
| 5,967,691 A | 10/1999 | Lancelot, III | |

FOREIGN PATENT DOCUMENTS

| | | |
|---|---|---|
| DE | 1 675 007 | 12/1970 |
| EP | 2 034 857 | 6/1980 |
| GB | 2 469 512 | 11/1980 |
| GB | 2 255 385 | 11/1992 |
| WO | WO 99/05375 | 2/1999 |
| WO | Wo 99/35354 | 7/1999 |

OTHER PUBLICATIONS

Serope Kalpakjian, Manufacturing Engineering and Technology, 1995, Addison–Wesley Publishing Company, Third Edition, pp. 453,845 and 847.*

* cited by examiner

Primary Examiner—Lynne H. Browne
Assistant Examiner—Victor MacArthur
(74) Attorney, Agent, or Firm—Higgs, Fletcher & Merck LLP; Charles F. Reidelbach, Jr.

(57) ABSTRACT

A fixture for connecting two or more elongate bars in end to end relationship. The bars are provided with ribs on an external surface thereof. The fixture comprises a set of inner segments with formations to engage with the ribs on the bars. A set of intermediate segments and/or an outer sleeve is then positionable around the inner segments to maintain the same in position. The outer sleeve passes over the intermediate segments and mechanically engages the segments and members in the end to end relationship.

17 Claims, 14 Drawing Sheets

Fig.3
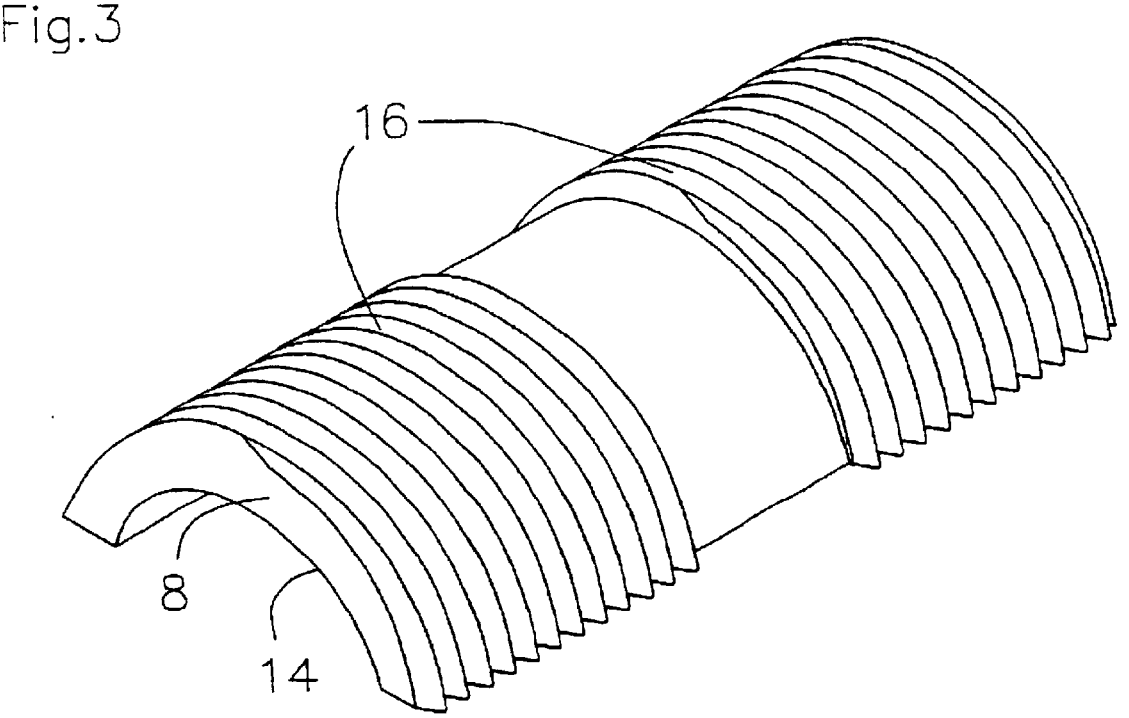
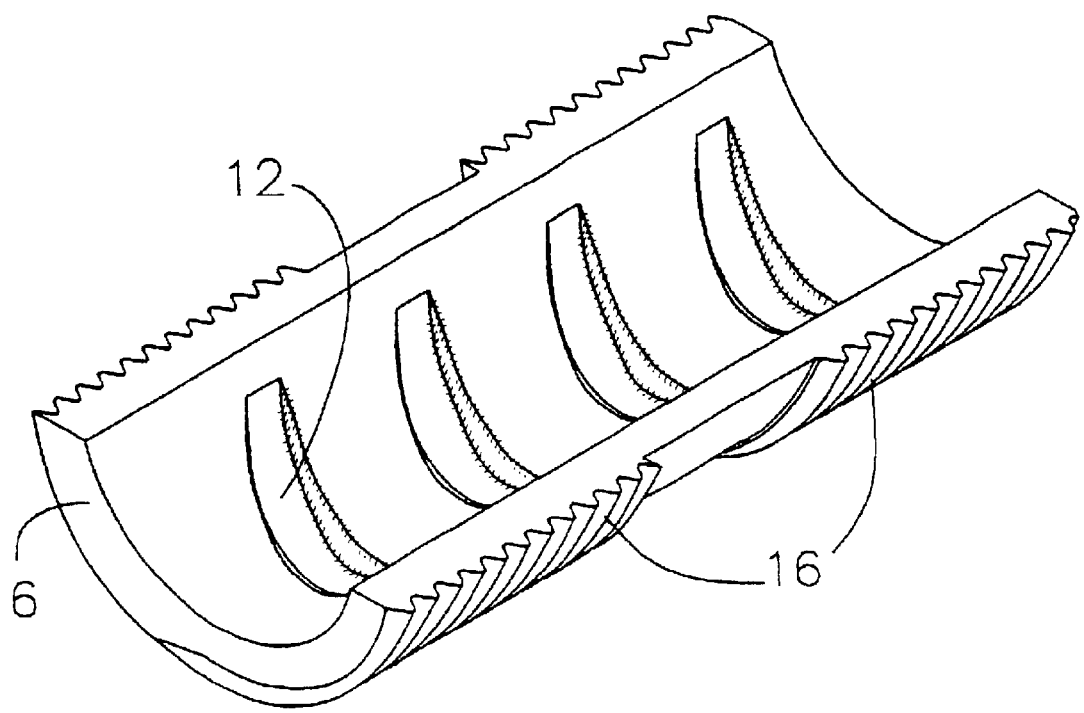

FIXTURE

The invention to which this application relates is a fixture in the form of a mechanical connection device and particularly, but not exclusively, to a fixture for joining concrete reinforcing steel bars, for joining any other surface profiled bars or creating an anchor on a single profiled bar.

Concrete reinforcing steel bats are used, as the name suggests for reinforcing concrete structures. The bars can be provided in different sizes and have different forms of rib patterns on their outer surfaces, to provide a mechanical interface between the bar and the concrete which surrounds the bar in use. The steel bars typically have to be mechanically connected together in forming the structure but conventional methods can compromise the fatigue performance and strength of the bars, which in turn, compromises the integrity of the final structure.

The technical requirements of the reinforcing bars generally relate to providing optimal tensile/compressive capability, strain performance and fatigue life. Conventionally, specialised equipment is employed to achieve these requirements, either at the point of installation or at a location where an additional process his to be carried out. One such example of a connector for connecting two bars together and requiring additional machinery is disclosed in U.S. Pat. No. 5,967,691. The ends of the bars in this connector assembly are required to have different outer surface formations to the remainder surface of the bars, thereby allowing shell elements to placed around the bar ends to bridge and connect the bars together. These outer surface formations are required to be machined or welded on. However, deformation of the bar is likely to compromise the fatigue performance of the bar. In addition, the requirement of additional equipment incurs expense through additional handling and the expense of the equipment itself. Furthermore, transport of equipment to the location of construction is often problematic, particularly in less developed countries where transport systems are more primitive. There is also the additional problem in that the skill level required to correctly carry out these specialised operations is not always readily available at the site where the process is to be carried out.

A further type of connector assembly is disclosed in GB2255385, wherein the assembly comprises a set of wedge shaped claws for location at each end of the bars being connected. Two externally threaded inner bushings are located over the claws and are joined to an internally threaded outer bushing, Problems associated with this type of connector are that some of the components require to be screwed together during assembly. As the bars are typically heavy and embedded in concrete, they are often not capable of being rotated. In addition, embedding of the assembly components onto the bars and with each other typically does not occur until application of the service load of the structure (load of the assembled structure on the bars in use). As a result, slipping of the components occurs on application of the service load, thereby resulting in cracking and/or damage to the structure.

It is therefore an aim of the present invention to provide a fixture in the form of a mechanical connection device for connecting together lengths of profiled material, such as concrete reinforcing steel (rebar), the fixture overcoming the abovementioned problems and being capable of use with material of different sizes and different outer surface profiles.

It is a further aim of the present invention to provide a fixture which can be used in accordance with the relevant international requirements, such as tensile/compressive capability, strain performance and fatigue life, without the need for any specialised equipment and by the most cost-effective means.

According to a first aspect of the present invention there is provided a fixture for connecting two or more concrete reinforcing members together in end to end relationship, said two or more members having outer profiled surfaces, said fixture including sets of inner segments, intermediate segments and an outer sleeve and characterised in that each set of inner segments have formations co engage with the outer profiled surfaces of each end of the members being connected, said inner segment formations being of complementary dimensions to the outer profiled surfaces of the members for location therewith, the intermediate segments having formations on an inner surface thereof complementary to formations on the outer surface of the inner segments to provide mechanical interlock therebetween, and an outer sleeve positionable around the sets of inner segments and intermediate segments to maintain the same in position.

Preferably the set of inner segments include a pair of segments for location around each of the two members, being of sufficient length to generate sufficient rib shear area.

Further preferably the set of intermediate segments includes a pair of segments for location around said inner segments and said two or more members.

Preferably the inner segments have the formations on an inner surface, and are of complementary dimensions to the profiled surface of the members. The inner segments can also be provided with a profiled outer surface fur engagement with complementary formations on the inner surface of the intermediate segments and these surfaces typically include fine pitch thread.

Preferably a semi-compressible fluid or coating is provided between the members and the inner segments to reduce clearance therebetween. In one embodiment this fluid is an extrudable coating. The coating intimately interfaces with the members to be joined in order to avoid any slip, and transfer any load within the members to their mating components.

In one embodiment the two or more members are elongate bars provided with a plurality of ribs on their outer surfaces.

Preferably the inner segments can be held in place by securing means in the form of a spring clip, rubber band, tying wise and/or the like, which is located in a recess portion on the outer surface of the segments.

In a further embodiment of the present invention an outer sleeve is provided for locating around the intermediate segments to maintain the components in position. Preferably in this embodiment the intermediate segment is tapered and the outer sleeve has a complementary taper to provide a frictional fit between the same The taper is typically between 0–3 degrees.

In an alternative embodiment no outer sleeve is provided and the intermediate segments are the outermost component of the assembly. In this embodiment fastening means are provided on the intermediate segments to secure the assembly together. Preferably these fastening means are recessed or flush with the outer surface of the intermediate segments.

Typically, the internally coned outer sleeve is driven over the intermediate segments by manual force such as by a hammer and generates a radial compressive force. This force embeds the inner segments onto the members and into the intermediate segments taking up any clearances caused by manufacturing tolerances of all components thereby minimising slip.

In a preferred embodiment the outer sleeve has an indication device, which will inform the installer when sufficient hammer blows have been applied.

The mechanical splice in accordance with the invention meets the needs of the commercial market, and has the following design features:

An intimate mechanical interlock with each of the members to be joined which has sufficient cross-sectional area in axial shear to be able to withstand the full tensile/compressive strength of the members without movement or slip, including the situation where load reversal occurs.

A large enough cross-sectional area at the location of the highest tensile stress to be able to withstand the full tensile capability of the members.

The mechanical connector does not adversely compromise the fatigue performance of the members.

In a second aspect of the present invention there is provided a fixture for connecting at least one concrete reinforcing member to an object, said at least one member having outer profiled surfaces, said fixture including sets of inner segments, intermediate segments and an outer sleeve and chatacterised in that each set of inner segments have formations to engage with the outer profiled surfaces of each end of the members being connected, said inner segment formations being of complementary dimensions to the outer profiled surfaces of the members for location therewith, the intermediate segments having formations on an inner surface thereof complementary to formations on the outer surface of the inner segments to provide mechanical interlock therebetween, and an outer sleeve positionable around the sets of inner segments and intermediate segments to maintain the same in position.

In a further aspect of the invention there is provided a fixture for connecting two or more elongate concrete reinforcing members in end to end relationship, said members provided with ribs on an external surface thereof, said fixture including sets of inner segments, intermediate segments and an outer sleeve and characterised in that each set of inner segments have formations to engage with the ribs at each end of the members being connected, said inner segment formations being of complementary dimensions to the ribs on the members for location therewith, the intermediate segments positionable around the inner segments and having formations on an inner surface thereof complementary to formations on the outer surface of the inner segments to provide mechanical interlock therebetween to maintain the same in position, and an outer sleeve which passes over the intermediate segments and mechanically engages the segments and members in the end to end relationship.

In a yet further aspect of the present invention there is provided a method of forming the fixture components and assembling the fixture components in use.

Specific embodiments of the invention are now described with reference to the accompanying drawings; wherein FIG. 1 illustrates a rebar in a conventional form;

FIG. 3 illustrates two of said inner segments;

Figure 1:
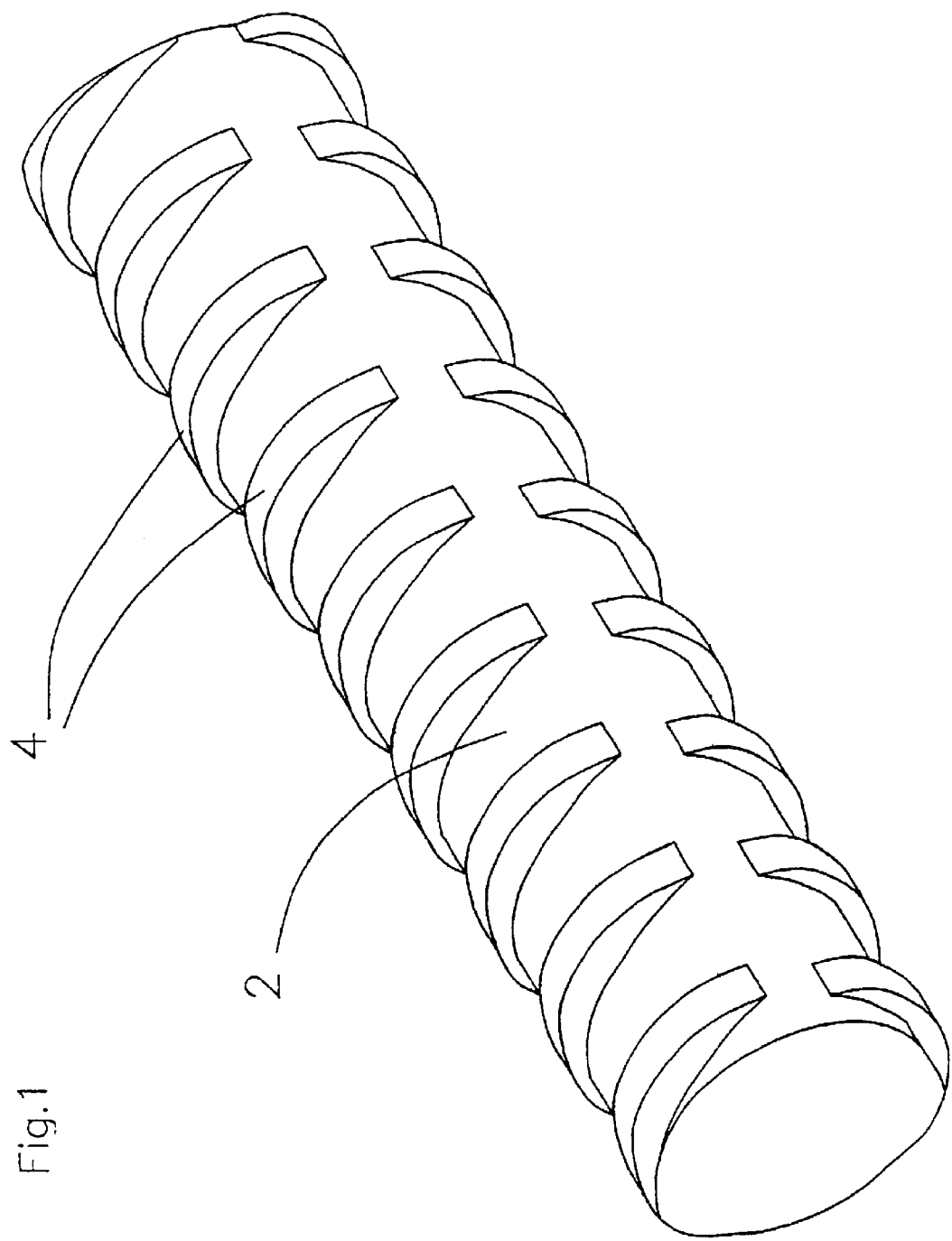
Figure 2:
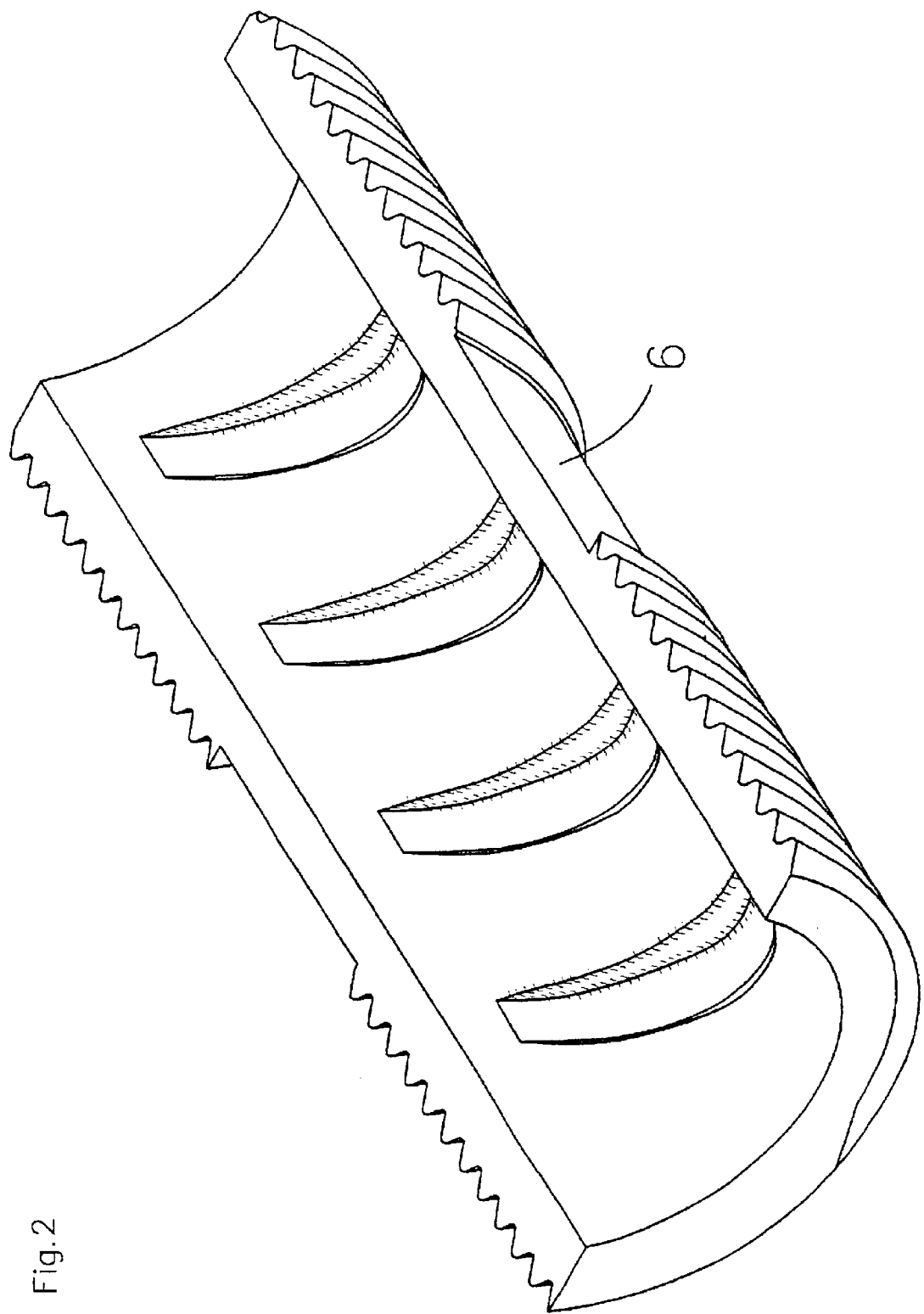
FIG. 2 illustrates an inner segment in one embodiment of the invention.

The requirements of the invention will be described with reference to concrete reinforcing steel bars. FIG. 1 illustrates an example of a conventional reinforcing steel bar (rebar) 2.

The rebar 2 is available internationally in a range of sizes from 6 mm to 57 mm in diameter and is provided with a series of ribs 4 on an outer surface thereof. The purpose of the ribs is to provide a mechanical interface with the concrete surrounding of the bar in order to reinforce the concrete. The ribs 4 are positioned on the outer surface in the form of a helix on two opposing sides of the bar, the ribs being formed during manufacturing of said bar. The angle of the helix on one side of the bar is typically the opposite of the angle on the other side, to prevent "unscrewing" of the bar from the concrete. The ribs can be provided in a number of different shapes and geometries depending on the standard laid down in the different countries and the structure in which the rebar is to be used.

A problem with conventional rebars is that conventional mechanical joining methods cannot be readily applied to the same. A method currently employed is to deform and/or thread the end portion of the rebar but this typically compromises the fatigue performance of the rebar and is therefore undesirable.

In accordance with the present invention mechanical joining of the rebar is achieved by using semi-circular inner segments 6, 8, as shown in FIGS. 2–6. The inner segments are supplied in pairs, one inner segment for each side of the rebar, and each inner segment engages with the ribs 4 on one or other side of the bar 2. The segment pair are pre-formed before supply with an inner surface 12, 14 profiled to correspond closely with the rib pattern on each side of the rebar.

The engagement of the inner segments with the rebar in this manner is a most favourable method with regard to the fatigue performance of the rebar. This is because the inner segments do not interrupt the surface or introduce any notches in the rebar, both of which can result in fatigue crack initiation points and a common problem with devices of this kind.

A further advantage of the joining method according to the invention is that the correct angular alignment and co-axiality of the pair of joined bars is assured. This feature is important as failure in fatigue is commonly caused by angular and/or axial misalignment, which sets up an additional, localised bending stress as the connection straightens under load.

The inner segments 6, 8 can be manufactured using a typical example of the rebar to which the segments are to be joined as a pattern. The results is that when a segment pair are subsequently fitted to a bar for splicing, their outer surfaces form a circle in section, albeit broken in two places. For example, the inner segments can be made using three-dimensional digitised optical scanning of the rebar. The image of the rebar is then inverted, manipulated and modified to provide the necessary clearance between the rebar and the segments and to produce the dimensions for the inner segments. A thin extrudable coating can be applied between the rebar and inner segments to reduce any clearance between the same.

The outer surface of the inner segments can also be profiled 16 such that they provide a mechanical interlock with a similarly profiled inner surface of a further mating component, referred to herein as an intermediate segment. The profile 16 may take the form of a fine pitch thread, as shown in FIG. 3. However, it is noted that the profile could also be of some other form, such as parallel grooves or knurled surface.

The material chosen for the inner segments, which may be composite in nature, will be such that some embedment and deformation takes place on final assembly, to provide a best possible interface between the rebar and the inner segments. However, the material must be able to withstand the full tensile/compressive capability of the rebar without movement or slip. A relatively soft material can be chosen because the inner segment length required to engage with sufficient ribs 4 to generate enough rib shear area will always be greater than the length required to generate enough shear area between the inner segment and an intermediate segment. This is because the substantial gaps between the ribs 4 is additive to the shear area for the inner segment. The primary consideration is for the inner segment to engage with only sufficient ribs on the rebar to prevent the ribs being sheared off under load.

Since the inner segments will have been manufactured using a typical example of the rebar they are to be joined therewith as a pattern, the available contact area at the rib/inner segment interface will have been maximised thereby minimising the rib engagement length required to achieve the full tensile/compressive capability of the rebar.

Figure 4:
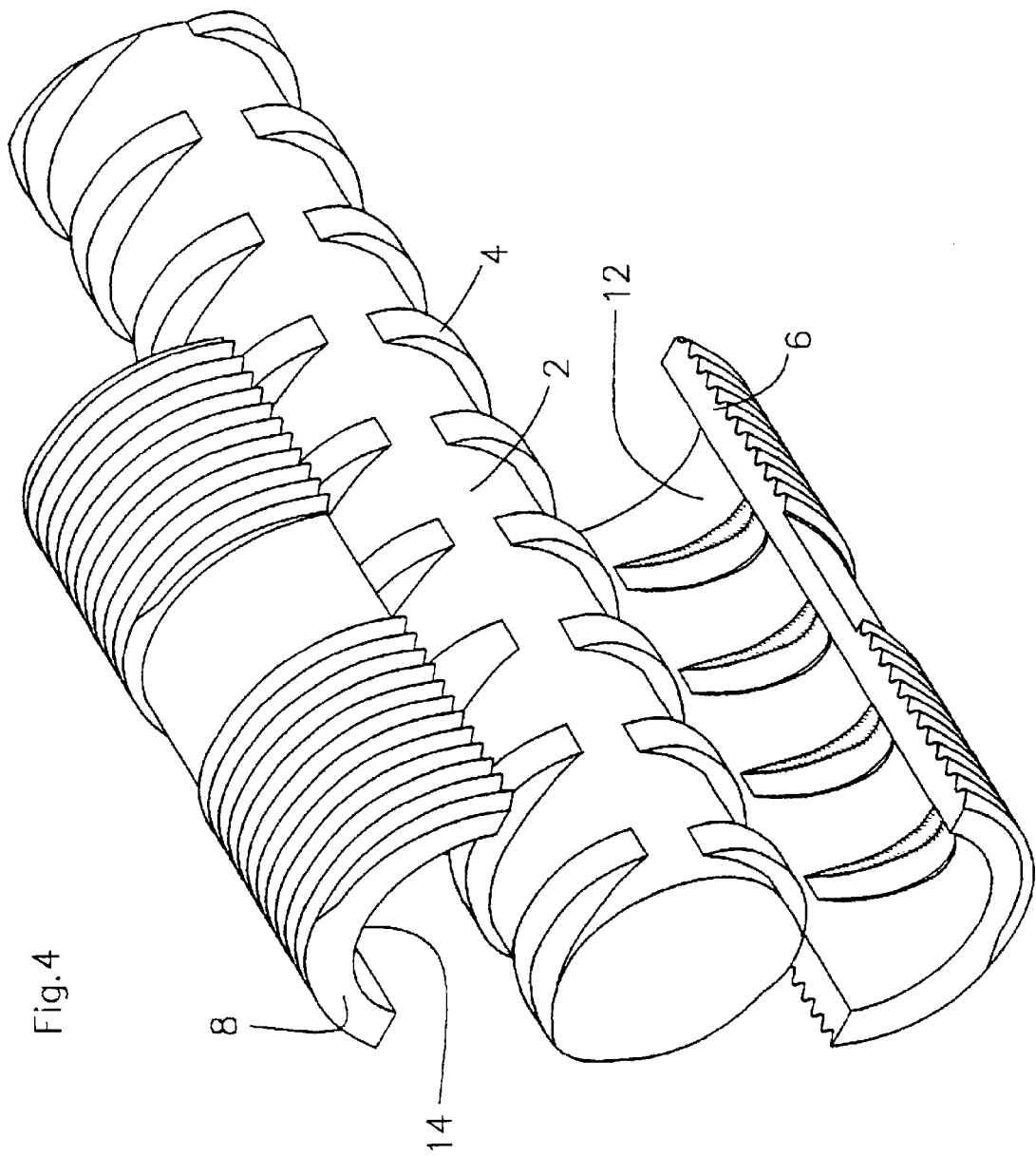
FIG. 4 illustrates the inner segments in relation to the rebar.
Figure 5:
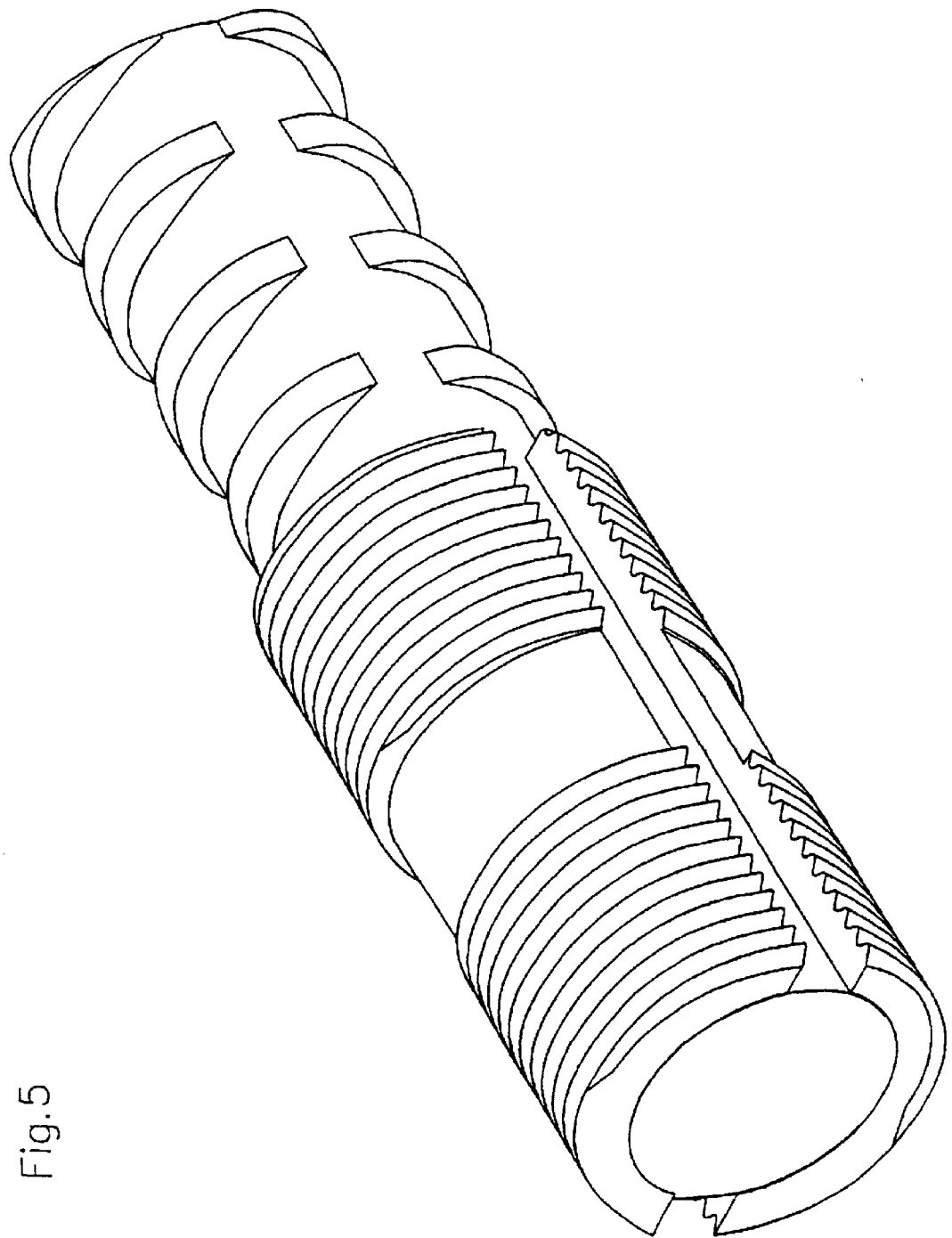
FIG. 5 illustrates the inner segments in position at one end of the rebar.

In practice, during assembly of the inner segments with the rebar, a pair of segments will be positioned around the end of a rebar on the correct sides such that they are as near to the bar end as possible without overhanging, as shown in FIGS. 4 & 5. The inner segments can be held in place by a spring clip (not shown), which is fitted into an undercut groove 18 provided during manufacture and located midway along the length of each inner segment. As there may be some longitudinal differential between the rib placements on the opposing sides of the rebar, it may be necessary to axially displace one inner segment relative to the other. As such, the undercut groove 18 is wide enough to still contain the spring clip and allow for axial displacement of the segments of up to ½ of a rib pitch.

Any other resilient means can be used to secure the inner segments such as a rubber band, tying wire and/or the like.

Figure 6:
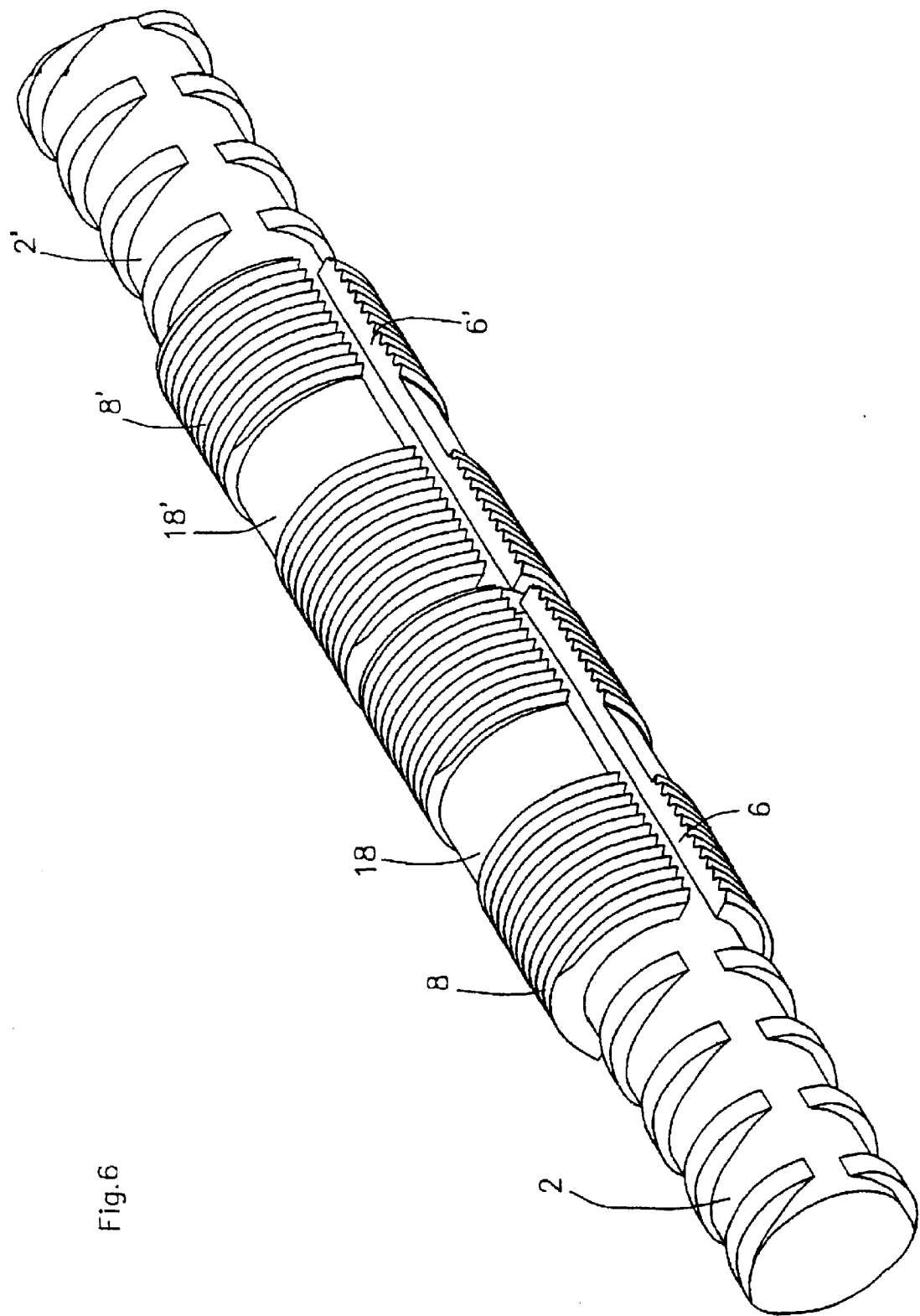
FIG. 6 illustrates the set of four inner segments, two at the ends of the two rebars to be joined together.

In order to effect joining of two rebar ends 2, 2', both rebars are fitted with a pair of segments 6, 8, 6', 8', and brought together end to end, as shown in FIG. 6.

Figure 7:
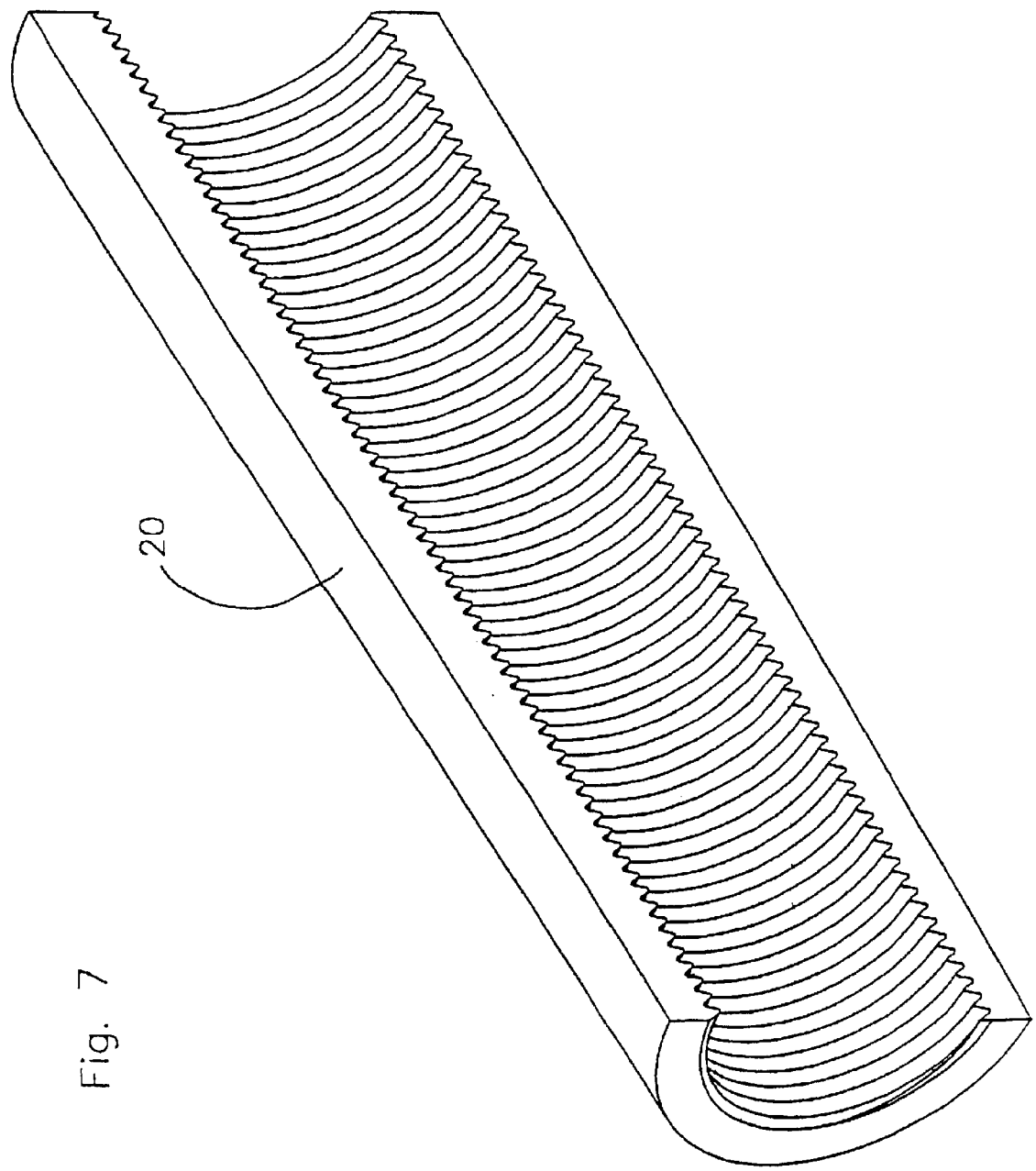
FIG. 7 illustrates an intermediate segment in accordance with the invention.
Figure 8:
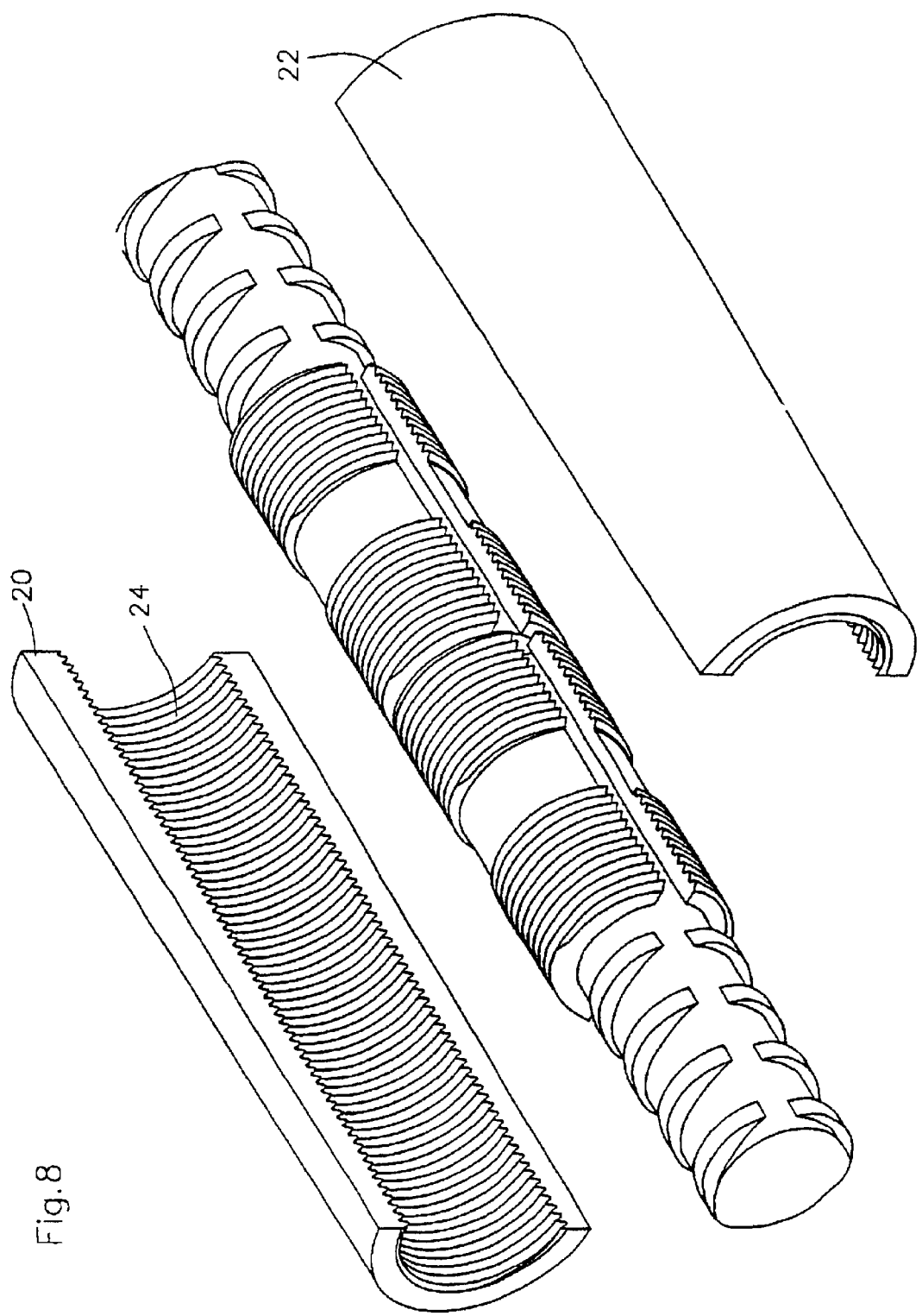
FIG. 8 illustrates the intermediate segments in relation to the inner segments and rebars.

The inner segments 6, 8, 6', 8' can then be connected by a further pair of semi-circular intermediate segments 20, 22, as shown in FIGS. 7 and 8. It is noted that more than two intermediate segments can be used in any given assembly.

The intermediate segments 20, 22 are supplied in matching sets and are the main load-bearing component of the assembly. As such, the intermediate segments will be made from a relatively high strength material in order that their size can be minimised. The inner surfaces of the segments 20,22 are profiled 24 to correspond with the similarly profiled 16 outer surfaces of the inner segments, thereby providing a mechanical interlock. The profile 24 can take the form of a fine pitch thread but could also be of some other form.

The cross-sectional area of the centre of the pair of intermediate segments is preferably sufficient to be able to withstand the full tensile capability of the rebar. The length of the intermediate segments is preferably sufficient to encompass both pairs of inner segments 6, 8, 6', 8' plus the amount required for maximum pitch differential of each pair of inner segments.

During manufacture, the split line separating the intermediate segments is kept to an absolute minimum. This operation can be carried out using high pressure water jetting or other high-speed precision cutting methods. Alternatively the inner and intermediate segments can be manufactured using a hot stamping process.

The outer diameter of the intermediate segments has a very shallow taper angle, in the order of, though not exclusively, one or two degrees, the mean diameter of which lies at the centre of the component. The selection of a shallow angle to provide a frustoconical shape, referred to as coning, maximises the translated radial compressive force, which is applied to the inner segments and the rebar, on final assembly. This is necessary in order to achieve the necessary embedment required to minimise slip under load. A further reason for using coning is that the maximum outside diameter is dictated by the amount that the diameter at the large end of the taper is greater than the mean diameter at the centre. The use of a shallow angle minimises this. This is advantageous as it minimises the overall profile of the finished assembly. This is desirable because there is a requirement within the construction industry to maintain a minimum amount of covering concrete between the furthest extremity of an assembled joint and the external surface of the concrete. The outside surfaces of the intermediate segments may be coated with a dry lubricant layer.

Figure 9:
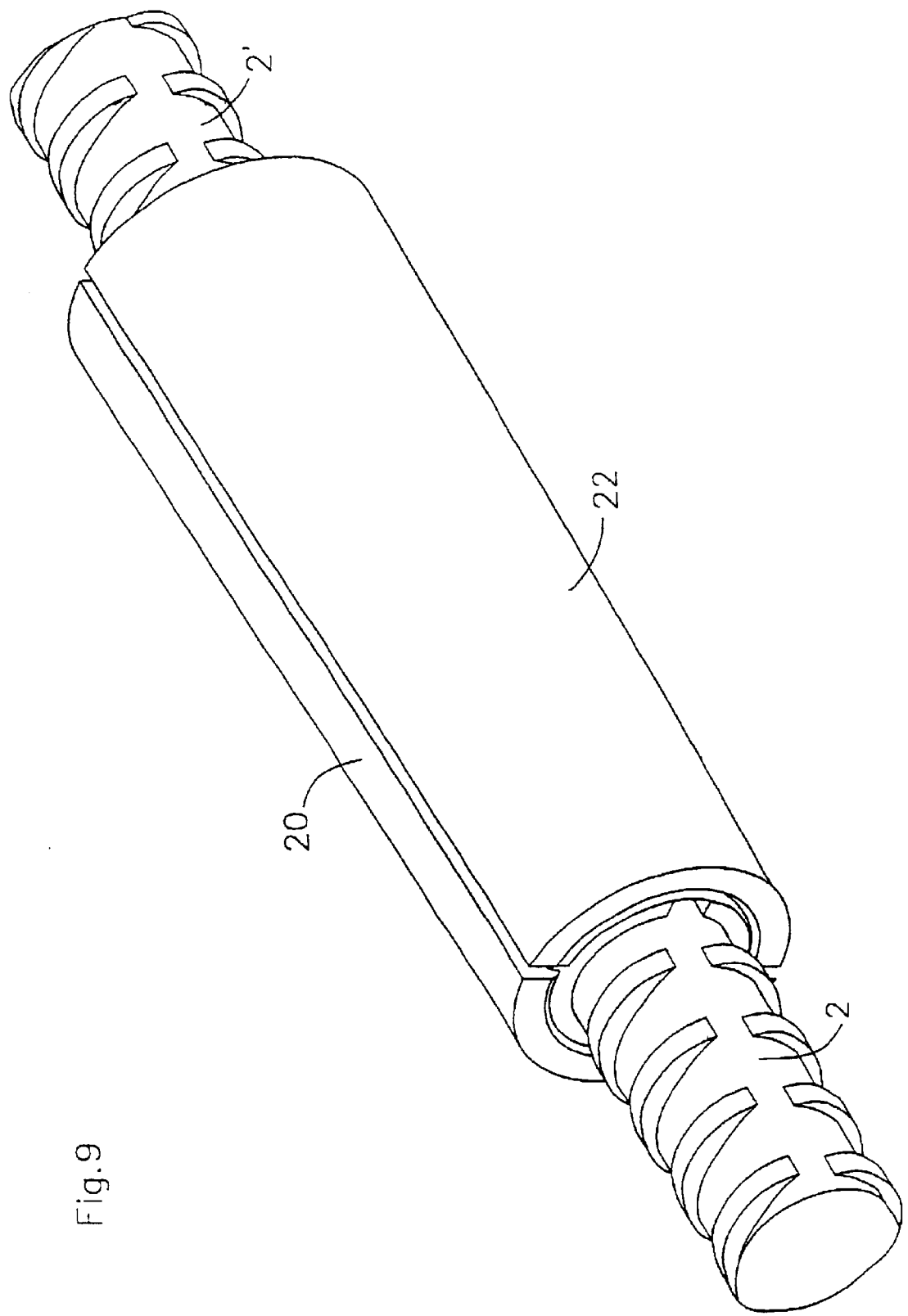
FIG. 9 illustrates the intermediate segments in position.

In practice, during assembly, a set of intermediate segments is offered around the pre-fitted inner segments on the pair of bars to be joined and then brought together around the inner segments such that they encompass them, as shown in FIGS. 8 & 9. The intermediate segments, when brought together have an outer shape of a truncated cone.

Figure 10:
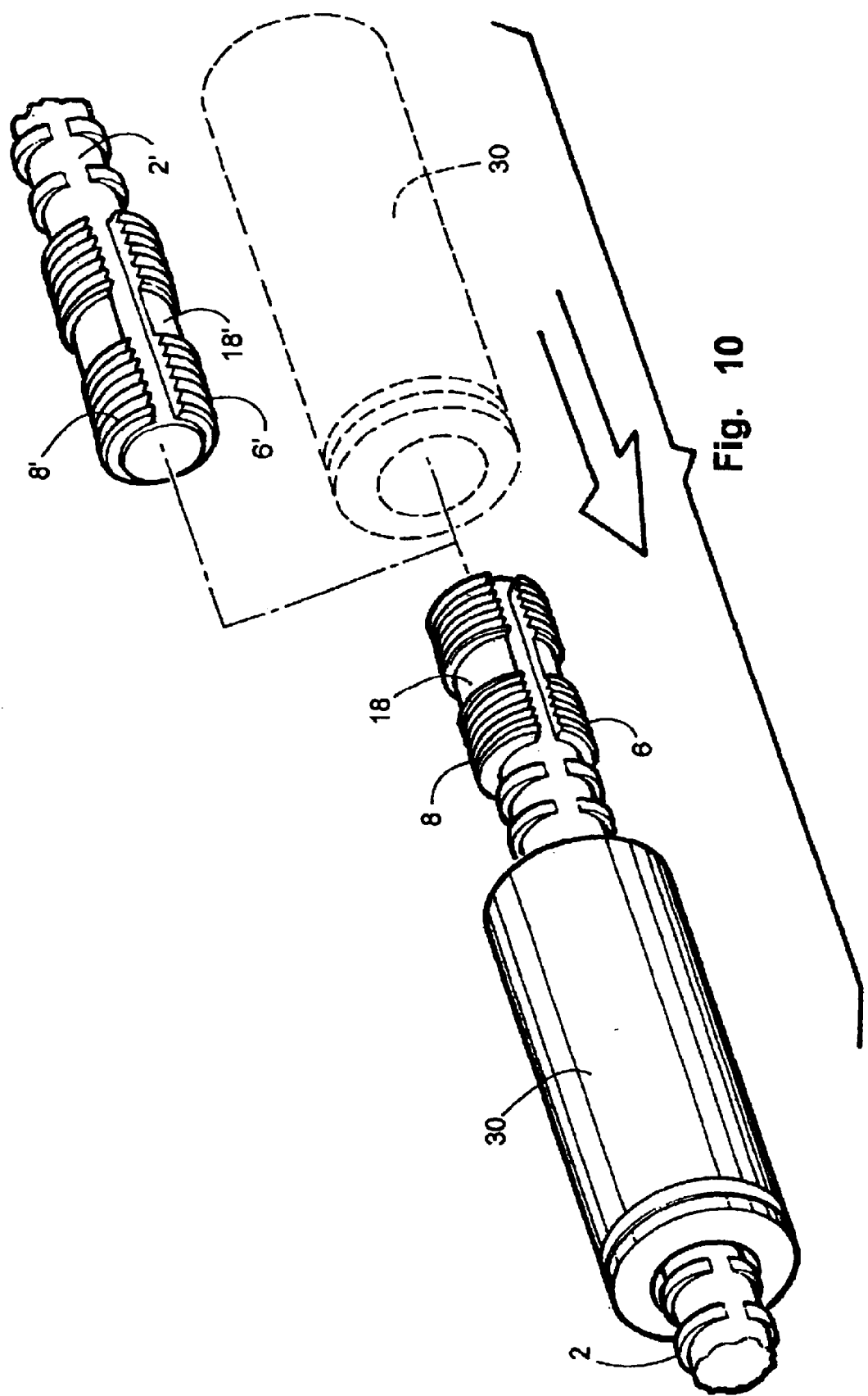
FIG. 10 illustrates the outer sleeve and its installation on a rebar prior to the placement of the intermediate segments.

The final component in the assembly is known as the outer sleeve 26, as shown in FIG. 10 installed on one of the rebar members prior to the placement of the intermediate members. The outer sleeve has a tapered bore, the angle of which corresponds with the taper angle of the outside diameter of the intermediate segments.

The outside diameter and material choice is such that the sleeve 26 deforms sufficiently to take up the shape of the irregular cone described by the intermediate segments, in their final positions without bursting.

In order to effect the connection it is driven over the set of intermediate segments with a series of hammer blows.

The outer sleeve 26 serves two purposes. Firstly, as a result of the hammer blows the sleeve provides the means to generate enough radial compressive force between the rebar and the intermediate segments to embed the inner segments both onto the rebar and into the intermediate segments. This removes any clearances through manufacturing tolerances, which may be present, thus achieving the necessary intimacy, Secondly the sleeve maintains the other components together in a completed assembly.

An advantage of the outer sleeve is that it requires no technical skill in order to fit the same.

The length of the outer sleeve 26 is sufficient to encompass the length of the intermediate segments plus an amount to allow for radial embedment of the inner and intermediate segments.

Figure 11:
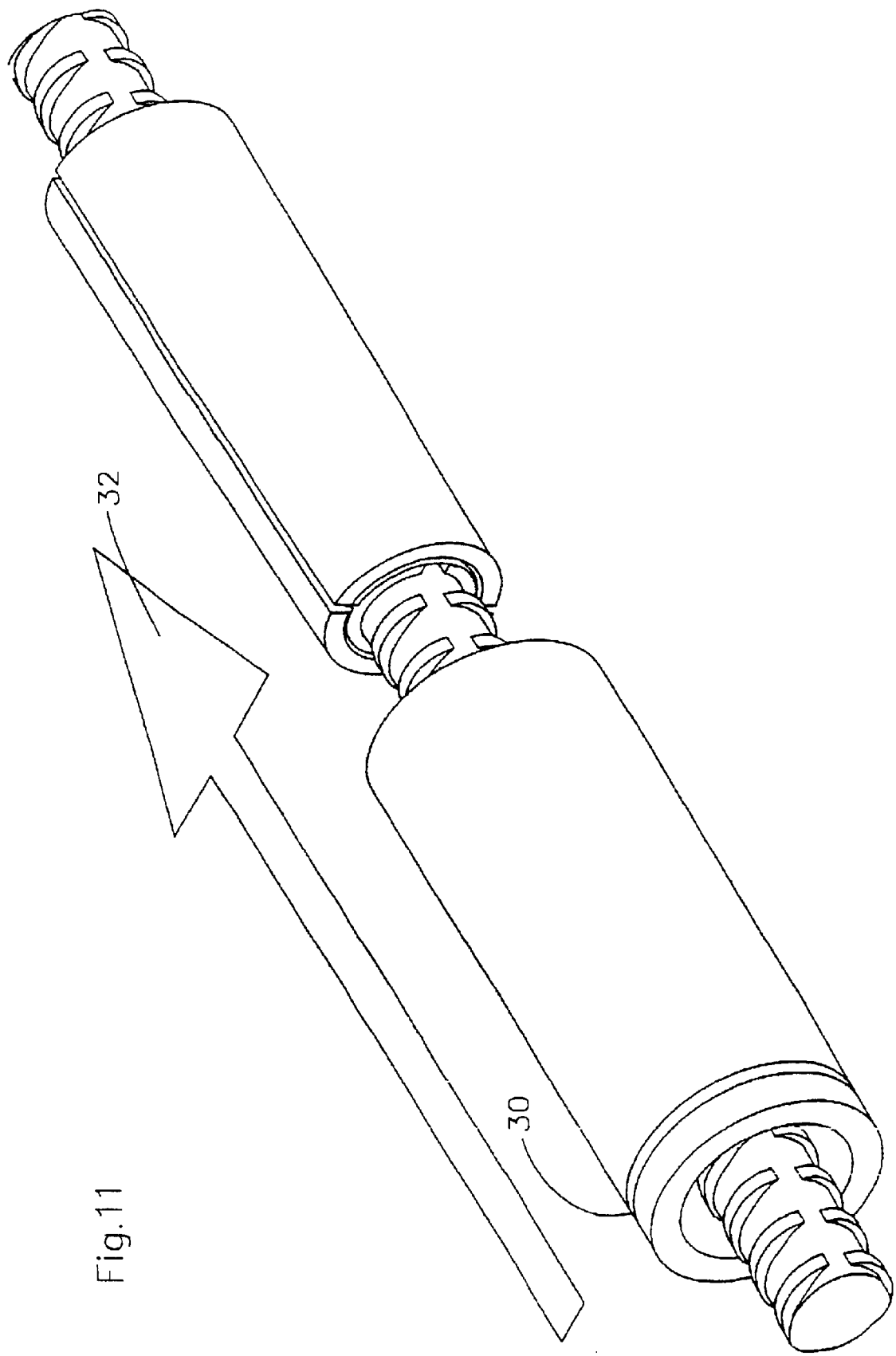
FIG. 11 illustrates the sleeve being moved onto the intermediate segments along the rebar.

In practice, during assembly, as illustrated in FIG. 10, the outer sleeve is installed onto the most suitable bar prior to the placement of the intermediate segments. The large end of the outer sleeve bore faces towards the joint as shown in FIG. 11. The intermediate segments are placed with their narrow ends towards the outer sleeve.

Figure 12:
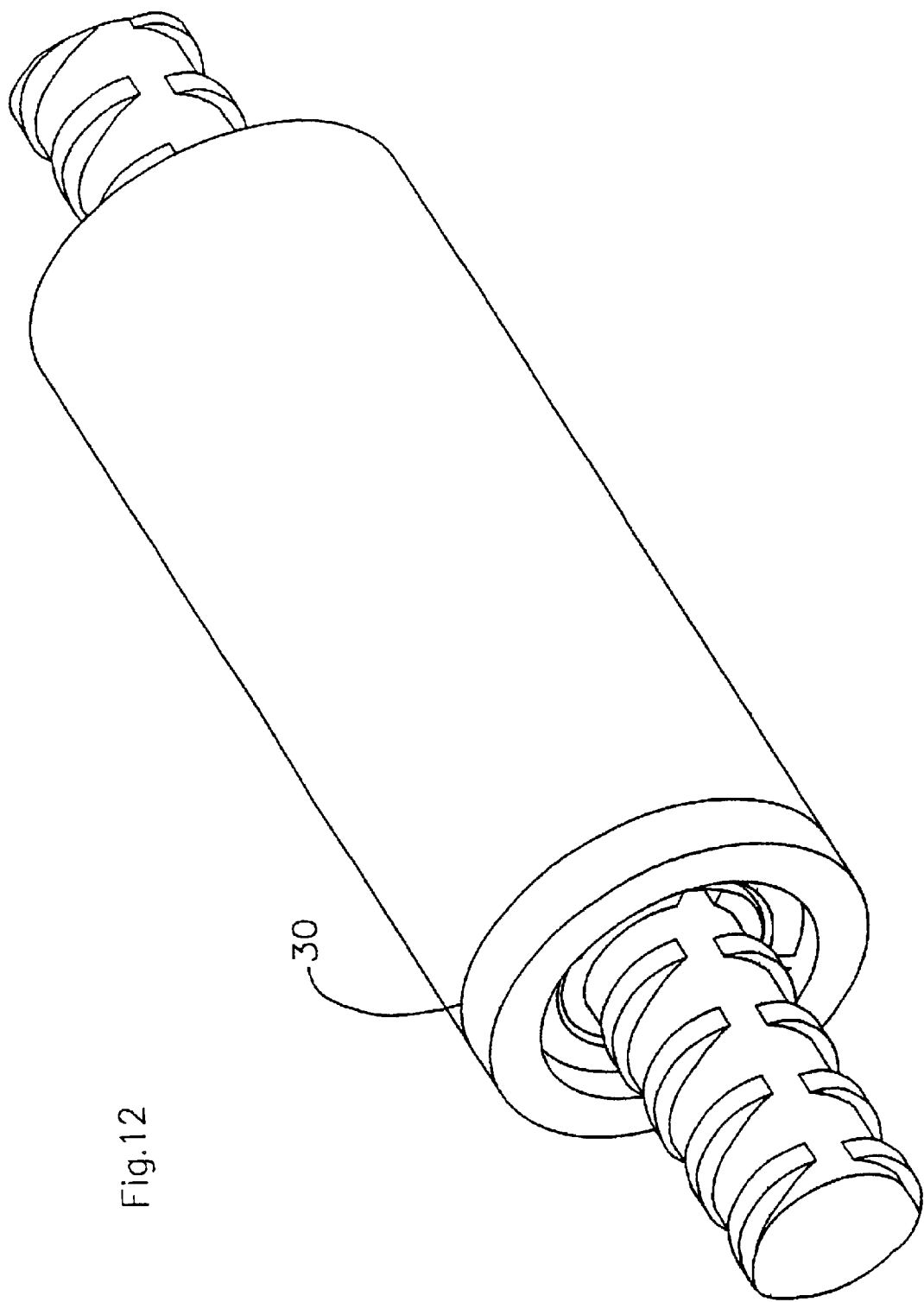
FIG. 12 illustrates the completed fixture in accordance with one embodiment of the invention.

The intermediate segments are held in place by hand while the outer sleeve is manually pushed on as far as possible. The outer sleeve is then driven to its final position by the application of hammer blows to the driven end as indicated by arrow 32 until it reaches its final position encompassing the entire length of the intermediate segments as shown in FIG. 12.

Figure 13A:
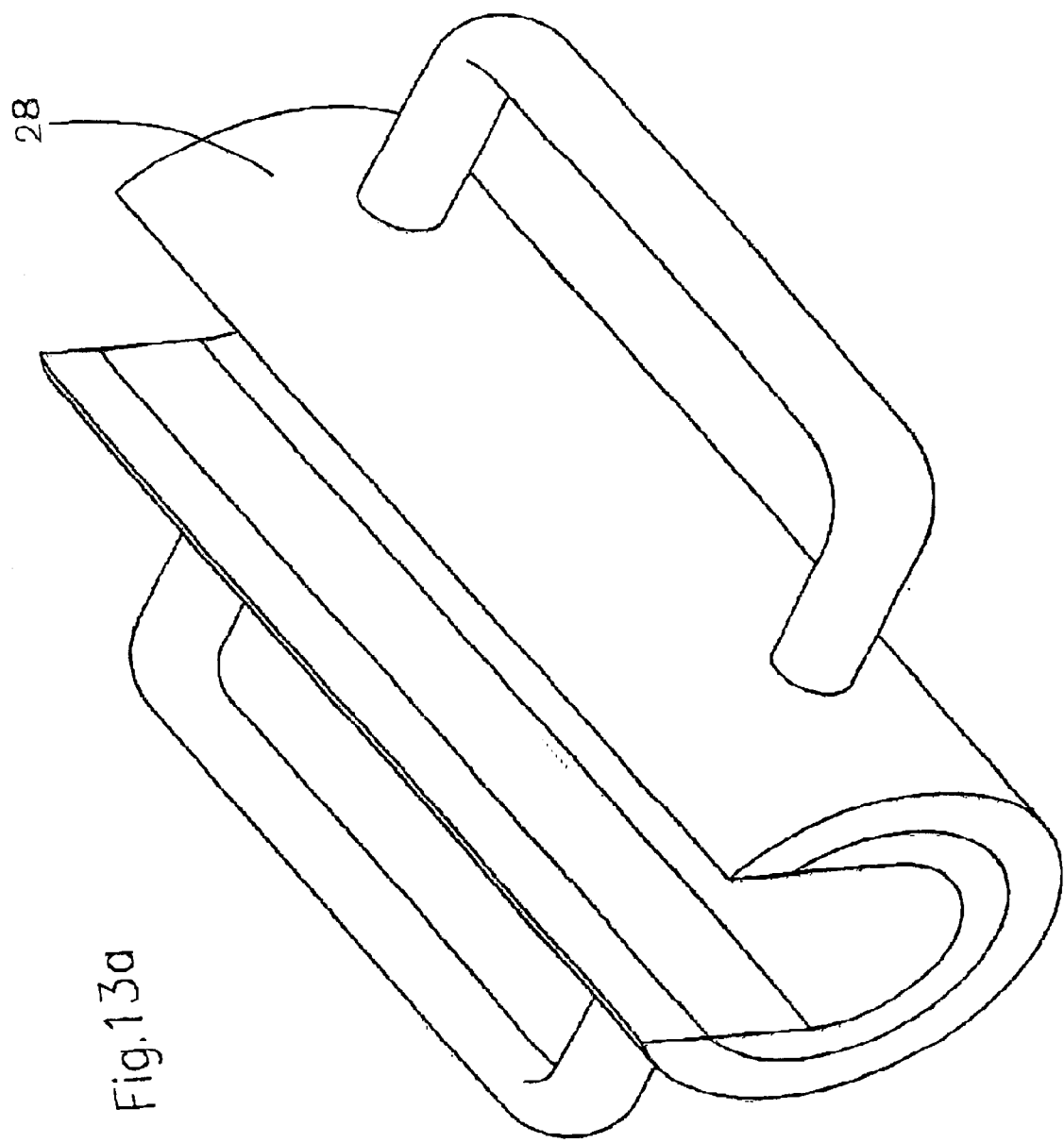
FIGS. 13a and b illustrate embodiments of tools for use with the fixture.
Figure 13B:
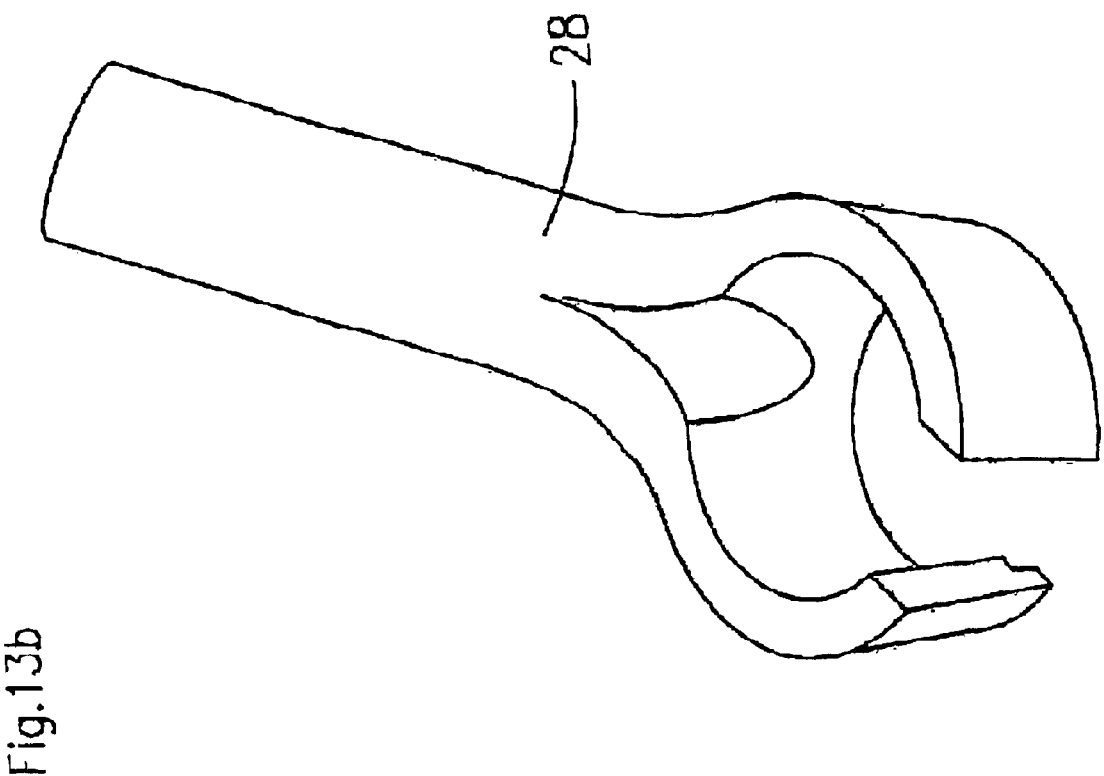

The hammer 28 can be a special slide hammer as shown in FIG. 13a, or can take the conventional form, either used by itself or with a specially shaped "drift" 29, as shown in FIG. 13b, designed to fit snugly around the driven end of the outer sleeve. Ideally it will take the form of a slide hammer, being a weighted, tubular device which is open along one side, i.e., "C" shaped in section. It will typically have a replaceable internal "C" shaped bush made of a material with a low co-efficient of friction. It will be of sufficient length to allow it to slide freely over the ribs 4 without rocking. It will ideally be fitted with handles.

An indication device 30 can be provided on the outer sleeve 26 which acts to inform the installer when sufficient hammer blows have been applied. For example, a brittle ring of resinous or ceramic material can be applied to the outside of the outer sleeve, which cracks and fall off when sufficient deformation of the outer sleeve has occurred. Another possibility is the inclusion of an undercut groove in the region of the driven ends which will close up when sufficient hammer blows have been applied.

In a further embodiment the intermediate segments can be provided with means to clamp the inner segments and rebar together without using the outer sleeve. In this embodiment the requirement for the intermediate segments to be coned is removed, thereby reducing the cost of the process. The means can include inner flanges which are clamped together by bolts. The bolts can be shear bolts. Alternatively the means can include a strap which can be wrapped around the intermediate segments and tightened using a ratchet or key type mechanism.

The inner segments and or other components can be made from either metallic or non-metallic material. The profiles on the inner segments, and intermediate segments are typically produced by hot forging/die stamping during manufacture.

The present invention is not just restricted to the application of rebars but can also be used in rock anchors where a single member is joined with an anchor using the fixture of the present invention, for joining of any other profiled bars or for any purpose where it is necessary to gain sufficient purchase on materials of this nature in order to apply a load in the axial direction of the elongate member.

Thus the fixture of the present invention provides a high performance, cost effective, mechanical connector which meets all international standards and requires no special equipment for bar preparation and installation.

What is claimed is:

1. A fixture for connecting two or more concrete reinforcing members together in end to end relationship, said two or more members having outer profiled surfaces, said fixture including sets of inner segments, intermediate segments and an outer sleeve and characterized in that each set of inner segments have formations to engage with the outer profiled surfaces of each end of the members being connected, said inner segment formations being of complementary dimensions to the outer profiled surfaces of the members for location therewith, the intermediate segments having formations on an inner surface thereof complementary to formations on the outer surface of the inner segments to provide mechanical interlock therebetween, and the outer sleeve positionable around the sets of inner segments and intermediate segments to maintain the same in position.

2. A fixture according to claim 1 wherein the set of inner segments includes a pair of segments for location around each end of the two or more members.

3. A fixture according to claim 1 wherein the set of intermediate segments includes a pair of segments for location around said inner segments and said two or more members.

4. A fixture according to claim 1 wherein the formations on the outer surface of the inner segments and the formations of the intermediate segments include any of a thread, parallel grooves or knurled surface.

5. A fixture according to claim 1 wherein the length of the intermediate segments or outer sleeve is sufficient to encompass at least the set of inner segments on each member.

6. A fixture according to claim 1 wherein a semi-compressible fluid or coating is provided between the members and the inner segments.

7. A fixture according to claim 1 wherein the inner segments are held in place on the members using securing means, the securing means being located in part or whole in at least one recessed portion on the outer surface of the inner segment.

8. A fixture according to claim 7 wherein the securing means includes resilient securing means.

9. A fixture according to claim 1 wherein the intermediate segments are provided with fastening means to fasten the same to the inner segments.

10. A fixture according to claim 1 wherein the intermediate segments form an external frustoconical surface and the outer sleeve has a complementary formed inner surface or bore to allow a locking action to be exerted on the intermediate segments.

11. A fixture according to claim 1 wherein the outer sleeve is provided with an indication device on an outer surface thereof.

12. A fixture according to claim 1 wherein the two or more members are elongate bars and the outer profiled surface of the members comprises a plurality of ribs.

13. A fixture for connecting at least one concrete reinforcing member to an object, said at least one member having outer profiled surfaces, said fixture including sets of inner segments, intermediate segments and an outer sleeve and characterized in that each set of inner segments have formations to engage with the outer profiled surfaces of each end of the members being connected, said inner segment formations being of complementary dimensions to the outer profiled surfaces of the members for location therewith, the intermediate segments having formations on an inner surface thereof complementary to formations on the outer surface of the inner segments to provide mechanical interlock therebetween, and the outer sleeve positionable around the sets of inner segments and intermediate segments to maintain the same in position.

14. A fixture according to claim 13 wherein the object is an anchor.

15. A fixture for connecting two or more elongate concrete reinforcing members in end to end relationship, said members provided with ribs on an external surface thereof, said fixture including sets of inner segments, intermediate segments and an outer sleeve and characterized in that each set of inner segments have formations to engage with the ribs at each end of the members being connected, said inner segment formations being of complementary dimensions to the ribs on the members for location therewith, the intermediate segments positionable around the inner segments and having formations on an inner surface thereof complementary to formations on the outer surface of the inner segments to provide mechanical interlock therebetween to maintain the same in position and the outer sleeve which passes over the intermediate segments and mechanically engages the segments and members in the end to end relationship.

16. A method of using a fixture according to claim 1 wherein a set of inner segments are placed around two members at the ends thereof which are to be joined end to end, and as near to the end as possible without overhanging said end, and a set of intermediate segments encompass the two members and the inner segments.

17. A method of using a fixture according to claim 1 wherein the outer sleeve is installed over a member prior to the placement of intermediate segments, a larger end of the outer sleeve bore facing toward the join between the two members being connected, locating intermediate segments over the inner segments on the members with narrow ends of the intermediate segments facing the outer sleeve, and then hammering the outer sleeve over the intermediate segment.

* * * * *